United States Patent
Yang

(10) Patent No.: US 10,148,385 B2
(45) Date of Patent: Dec. 4, 2018

(54) OPTICAL PORT AUTO-NEGOTIATION METHOD, OPTICAL MODULE, CENTRAL OFFICE END DEVICE, AND TERMINAL DEVICE

(71) Applicant: Huawei Technologies Co., Ltd., Shenzhen (CN)

(72) Inventor: Sulin Yang, Shenzhen (CN)

(73) Assignee: Huawei Technologies Co., Ltd, Shenzhen (CN)

(*) Notice: Subject to any disclaimer, the term of this patent is extended or adjusted under 35 U.S.C. 154(b) by 0 days.

(21) Appl. No.: 15/586,837

(22) Filed: May 4, 2017

(65) Prior Publication Data

US 2017/0237518 A1 Aug. 17, 2017

Related U.S. Application Data

(63) Continuation of application No. PCT/CN2014/090325, filed on Nov. 5, 2014.

(51) Int. Cl.
*H04B 10/00* (2013.01)
*H04J 14/02* (2006.01)
(Continued)

(52) U.S. Cl.
CPC .......... *H04J 14/0227* (2013.01); *H04B 10/07* (2013.01); *H04B 10/27* (2013.01);
(Continued)

(58) Field of Classification Search
USPC ...................................... 398/58–73
See application file for complete search history.

(56) References Cited

U.S. PATENT DOCUMENTS 7,110,670 B1 * 9/2006 Au ..................... H04Q 11/0005
398/48
7,839,766 B1 * 11/2010 Gardner .............. H04J 14/0294
370/218
(Continued)

FOREIGN PATENT DOCUMENTS

CN 101213776 A 7/2008
CN 102065343 A 5/2011
(Continued)

*Primary Examiner* — Agustin Bello
(74) *Attorney, Agent, or Firm* — Slater Matsil, LLP

(57) ABSTRACT

The present application provides an optical port auto-negotiation method, including: a: selecting a downstream to-be-received wavelength; b: listening to a downstream message on the selected downstream to-be-received wavelength, performing c if a wavelength idle message is received, and returning to a if no wavelength idle message is received within a specified or fixed time, where the wavelength idle message is used to identify that the wavelength is not occupied or not allocated; c: sending a wavelength application message on an upstream wavelength, performing d if a wavelength grant message is received in a downstream direction; otherwise, going back to a or b, where the wavelength application message is used to identify a request for allocation of the wavelength, and the wavelength grant message is used to identify acknowledgment of wavelength allocation; and d: setting an optical port auto-negotiation success flag bit. The present application further provides an optical module.

18 Claims, 12 Drawing Sheets

(51) Int. Cl.
*H04B 10/07* (2013.01)
*H04Q 11/00* (2006.01)
*H04B 10/27* (2013.01)

(52) U.S. Cl.
CPC ...... *H04J 14/0257* (2013.01); *H04J 14/0272* (2013.01); *H04J 14/0282* (2013.01); *H04Q 11/00* (2013.01)

(56) References Cited

U.S. PATENT DOCUMENTS

| | | |
|---|---|---|
| 2004/0213566 A1 | 10/2004 | Takanashi et al. |
| 2006/0188258 A1* | 8/2006 | Gumaste ............ H04J 14/0227 398/59 |
| 2008/0138072 A1 | 6/2008 | Sakamoto et al. |
| 2008/0166127 A1 | 7/2008 | Kazawa et al. |
| 2009/0016726 A1 | 1/2009 | Suzuki et al. |
| 2010/0221007 A1 | 9/2010 | Sakamoto et al. |
| 2011/0091213 A1 | 4/2011 | Kawaza et al. |
| 2013/0004174 A1 | 1/2013 | Lee et al. |
| 2014/0205293 A1 | 7/2014 | Lin et al. |
| 2017/0237518 A1* | 8/2017 | Yang ................... H04J 14/0227 398/79 |

FOREIGN PATENT DOCUMENTS

| | | |
|---|---|---|
| CN | 102104812 A | 6/2011 |
| CN | 102136674 A | 7/2011 |
| EP | 1978653 A1 | 10/2008 |
| JP | 2003318833 A | 11/2003 |
| JP | 2006197489 A | 7/2006 |
| JP | 2008147913 A | 6/2008 |
| JP | 2008172351 A | 7/2008 |
| WO | 2007086514 A1 | 8/2007 |

* cited by examiner

OPTICAL PORT AUTO-NEGOTIATION METHOD, OPTICAL MODULE, CENTRAL OFFICE END DEVICE, AND TERMINAL DEVICE

CROSS-REFERENCE TO RELATED APPLICATIONS

This application is a continuation of International Application No. PCT/CN2014/090325, filed on Nov. 5, 2014, the disclosure of which is hereby incorporated by reference in its entirety.

TECHNICAL FIELD

The present application relates to optical communications technologies, and in particular, to an optical port auto-negotiation method, an optical module, a central office end device, and a terminal device.

BACKGROUND

With a continuous increase in bandwidth requirements of users and support from broadband strategies of governments of various countries, passive optical networks (PON) are massively deployed around the globe.

Generally, a PON system includes an optical line terminal (OLT) located in a central office, multiple optical network units (ONU) or optical network terminals (ONT) located at a user side, and an optical distribution network (ODN) used to perform multiplexing/demultiplexing on an optical signal between the optical line terminal and the optical network units. The optical line terminal and the optical network unit perform upstream and downstream data transceiving by using optical modules disposed in the optical line terminal and the optical network unit. Because a Gigabit passive optical network (GPON), an Ethernet passive optical network (EPON), a 10GPON, or a 10GEPON that is currently deployed or is being deployed is a single-wavelength system, that is, there is only one wavelength in an upstream (a direction from the ONU to the OLT is referred to as upstream) direction and a downstream (a direction from the OLT to the ONU is referred to as downstream) direction, an upstream bandwidth and a downstream bandwidth are shared by multiple ONUs, limiting bandwidth improvement of each ONU. For ease of description, the following ONU is an alternative name of an ONU and/or ONT.

To improve a transmission bandwidth of a same fiber, the International Telecommunication Union Telecommunication Standardization Sector (ITU Telecommunication Standardization Sector, ITU-T) standard organization is formulating a time wavelength division multiplex passive optical network (TWDM-PON). The TWDM-PON is a time division multiplex (TDM) and wavelength division multiplex (WDM) hybrid system. In the downstream direction, there are multiple (generally 4 to 8) wavelengths to be transmitted in a WDM manner, and in the upstream direction, there are also multiple (generally 4 to 8) wavelengths to be transmitted in a WDM manner. Each ONU may choose to receive data of any downstream wavelength and uploads data by using any upstream wavelength. Specific wavelength allocation is controlled by the OLT, and function control is mainly performed by a Media Access Control (MAC) module of the OLT. Each wavelength works in a TDM mode. That is, one wavelength may be connected to multiple ONUs, each ONU connected to a same wavelength in the downstream direction occupies a bandwidth of a partial timeslot, and each ONU connected to a same wavelength in the upstream direction uploads data in a time division manner. In the TWDM-PON, which wavelength an ONU is registered with is controlled by the OLT. Because a laser diode (LD) implementing electrical-to-optical conversion and a photo detector (PD) implementing optical-to-electrical conversion are in an optical module, which is generally a pluggable optical module such as a small form-factor pluggable (SFP), the OLT needs to use a MAC of the ONU to control an optical module of the ONU to select a particular wavelength for receiving and sending. Therefore, two problems exist: one is that complex interaction is needed between an OLT and an ONU; and the other is that an optical module cannot work independently of an ONU and an OLT, that is, an optical module used in a TWDM-PON cannot be used in another WDM scenario, for example, cannot be used as an optical module of an Ethernet switch optical port.

Another manner for improving a transmission bandwidth of a same fiber is a wavelength division multiplex passive optical network (WDM-PON). A specific structure is shown in FIG. 3. An operating wavelength of each ONU is determined by an array waveguide grating (AWG) because a wavelength passing through each AWG port is determinate, and an optical module of each ONU works at a different wavelength. In a WDM-PON, there are mainly two types of optical modules. One is that a wavelength of an optical module of each ONU is fixed, that is, an optical module is colored. In this case, N optical modules of different types are needed to deploy one WDM-PON. N is a quantity of ports of an AWG. Storage and management of optical modules are relatively troublesome. The other optical module has a tunable wavelength and is also referred to as a colorless optical module. There are multiple manners for implementing a colorless optical module. CN201010588118.2 provides a self-seeded colorless WDM-PON solution. An external cavity laser is implemented by changing an ODN structure and adding a reflector between two AWGs. Autonomous wavelength selection is directly performed by using an AWG, to select a wavelength of each ONU optical module. FIG. 4 is a tunable laser-based WDM-PON. A self-seeded colorless WDM-PON needs to modify an existing ODN network and is not suitable for a splitter-based ODN network. These splitter-based ODN networks have been deployed on a global scale and are used for GPON or EPON access routing. Allocation and management of a wavelength of a tunable laser-based colorless WDM-PON optical module are still in the charge of OLT and ONU devices. Tight coupling between the devices and the optical module limits that such colorless optical modules can be applied only to WDM-PON devices supporting wavelength allocation and management but cannot be directly used as optical modules of Ethernet switches that are already widely used.

Therefore, the prior art still cannot provide a colorless optical module, which can be directly used as an optical module of a conventional Ethernet switch or another network device already deployed.

SUMMARY

To resolve the foregoing problem, embodiments of the present invention provide an optical port auto-negotiation method, an optical module, a central office end device, and a terminal device. Technical solutions of the embodiments of the present invention are as follows.

According to a first aspect, an optical port auto-negotiation method includes the following steps. a: selecting, by a first optical module, a downstream to-be-received wavelength; b: listening to a downstream message on the selected downstream wavelength to be received, performing c if a wavelength idle message from a second optical module is received, and returning to a if no wavelength idle message is received within a specified or fixed time, where the wavelength idle message is used to identify that the downstream to-be-received wavelength is not occupied or not allocated. The method also includes c: sending a wavelength application message on an upstream wavelength corresponding to the downstream wavelength, going to d if a wavelength grant message is received in a downstream direction; otherwise, returning to a or b, where the wavelength application message is used to identify that the first optical module requests the second optical module to allocate the downstream wavelength, and the wavelength grant message is used to identify that the second optical module allocates the downstream wavelength to the first optical module. The method also includes d: setting, by the first optical module, an optical port auto-negotiation success flag bit, where the wavelength application message is coupled to a data signal and is sent to the second optical module by using a data channel.

With reference to the first aspect, in a first possible implementation manner of the first aspect, a correspondence between upstream wavelengths and downstream wavelengths is stored in the first optical module in a form of a table, where the correspondence is agreed upon in advance, or is dynamically configured by an optical network unit ONU device by using an interface between the ONU device and the first optical module at an ONU-side, or is delivered to a processor of the first optical module at the ONU side by using a control message.

With reference to the first possible implementation manner of the first aspect, in a second possible implementation manner of the first aspect, if the correspondence between upstream wavelengths and downstream wavelengths is agreed upon in advance or dynamically configured, the first optical module sets an operating wavelength or a to-be-sent wavelength of a sending component of the first optical module at any moment before the wavelength application message is sent.

With reference to the first possible implementation manner of the first aspect, in a third possible implementation manner of the first aspect, if the correspondence between upstream wavelengths and downstream wavelengths is delivered by using a control message, an operating wavelength or an upstream wavelength of a sending component of the first optical module is set after the wavelength idle message from the second optical module is received and before the wavelength application message is sent.

With reference to the first aspect or any possible implementation manner of the first aspect, in a fourth possible implementation manner of the first aspect, the wavelength idle message and the wavelength grant message are broadcast or multicast messages.

With reference to the first aspect and any possible implementation manner of the first aspect, in a fifth possible implementation manner of the first aspect, a message frame of the wavelength application message includes a local to-be-sent wavelength field, and the local to-be-sent wavelength field denotes wavelength information by using an absolute value, a relative value, or a channel number.

With reference to the first aspect and any possible implementation manner of the first aspect, in a sixth possible implementation manner of the first aspect, a message frame of the wavelength idle message includes an allowed laser spectral width field, a channel interval field, or a system type field.

With reference to the first aspect and any possible implementation manner of the first aspect, in a seventh possible implementation manner of the first aspect, the message frame of the wavelength idle message is coded by using a random code.

With reference to the seventh possible implementation manner of the first aspect, in an eighth possible implementation manner of the first aspect, multiple bits are used to represent the frame header when a length M of a random code representing data in a frame header field of the message frame of the wavelength idleness message is the same as a length of a random code N representing data content in a data field, and one bit is used to represent the frame header when M is not the same as N.

With reference to the seventh possible implementation manner of the first aspect, in a ninth possible implementation manner of the first aspect, when the wavelength idle message is coded by using a random code, random sequences of different lengths are used to represent 0 and 1 respectively.

With reference to the first aspect and any possible implementation manner of the first aspect, in a tenth possible implementation manner of the first aspect, the message frame of the wavelength idle message is coded by using a square-wave frequency signal or a sine-wave frequency signal.

According to a second aspect, an optical port auto-negotiation method includes periodically sending, by a local optical module, a wavelength idle message to a peer optical module, and listening in an upstream direction, where the wavelength idle message is used to identify that a first wavelength is an idle wavelength, or a first wavelength is not occupied or not allocated. The method also includes suspending sending the wavelength idle information when a message, sent by the peer optical module, for requesting allocation of the first wavelength is received; sending a wavelength application success message to the peer optical module. The method also includes setting an internal state when a response message sent by the peer optical module is received, where the setting is used to identify completion of a wavelength negotiation, where the wavelength idle message or the wavelength application success message is coupled to a data signal and is delivered to the peer optical module by using a data channel.

With reference to the second aspect, in a first possible implementation manner of the second aspect, the method further includes sending a wavelength acknowledgment message to the peer optical module before the internal state is set.

With reference to the second aspect and the first possible implementation manner of the second aspect, in a second possible implementation manner of the second aspect, the method further includes: when a sending component and a receiving component of the local optical module are components with a tunable wavelength or capable of tuning a wavelength, setting, by the optical module, operating wavelengths of the sending component and the receiving component according to configuration information.

With reference to the second aspect, in a third possible implementation manner of the second aspect, the wavelength idle message and the wavelength application success message are coded by means of frequency-shift keying FSK.

With reference to the third possible implementation manner of the second aspect, in a fourth possible implementation manner of the second aspect, the wavelength idle message and the wavelength application success message are coded in a spectrum spreading manner, and the spectrum spreading manner is used to identify that spectrum spreading is performed on original signals 0 and 1 by using a random code, and then the signals are superposed with a data signal and transmitted.

According to a third aspect, an optical module includes a sending component, a processing component, and a receiving component, where the receiving component is configured to select a downstream to-be-received wavelength. The processing component is configured to listen to a downstream message on the selected downstream to-be-received wavelength, and send a wavelength application message on an upstream wavelength corresponding to the downstream to-be-received wavelength by using the sending component when a wavelength idle message from a peer optical module is received. The processing component is further configured to set an optical port negotiation flag bit of the optical module to success when the receiving component receives a wavelength grant message in a downstream direction; and the processing component is further configured to couple a wavelength request message to a data signal, so that the wavelength request message is sent by using a data channel.

With reference to the third aspect, in a second possible implementation manner of the third aspect, if the correspondence between upstream wavelengths and downstream wavelengths is agreed upon in advance or dynamically configured, the processing component of the optical module is further configured to set an operating wavelength or a to-be-sent wavelength of the sending component of the optical module at any moment before the wavelength application message is sent.

With reference to the third aspect, in a third possible implementation manner of the third aspect, if the correspondence between upstream wavelengths and downstream wavelengths is delivered by using a control message, the processing component of the optical module is further configured to set an operating wavelength or an upstream wavelength of the sending component of the optical module after the wavelength idle message from the peer optical module is received and before the wavelength application message is sent.

With reference to the third aspect and any possible implementation manner of the third aspect, in a fourth possible implementation manner of the third aspect, a message frame of the wavelength application message includes a local to-be-sent wavelength field, and the local to-be-sent wavelength field denotes wavelength information by using an absolute value, a relative value, or a channel number.

With reference to the third aspect and any possible implementation manner of the third aspect, in a fifth possible implementation manner of the third aspect, a message frame of the wavelength idle message includes an allowed laser spectral width field, a channel interval field, or a system type field.

With reference to the third aspect and any possible implementation manner of the third aspect, in a sixth possible implementation manner of the third aspect, the message frame of the wavelength idle message is coded by using a random code.

With reference to the sixth possible implementation manner of the third aspect, in a seventh possible implementation manner of the third aspect, multiple bits are used to represent the frame header when a length M of a random code representing data in a frame header field of the message frame of the wavelength idle message is the same as a length of a random code N representing data content in a data field, and one bit is used to represent the frame header when M is not the same as N.

With reference to the sixth possible implementation manner of the third aspect, in an eighth possible implementation manner of the third aspect, when the wavelength idle message is coded by using a random code, random sequences of different lengths are used to represent 0 and 1 respectively.

With reference to the third aspect and any possible implementation manner of the third aspect, in a ninth possible implementation manner of the third aspect, the message frame of the wavelength idle message is coded by using a square-wave frequency signal or a sine-wave frequency signal.

According to a fourth aspect, an optical module includes a sending component, a receiving component, and a processing component, where the sending component periodically sends a wavelength idle message to a peer optical module and the receiving component listens in an upstream direction, and the wavelength idle message is used to identify that a first wavelength is an idle wavelength, or a first wavelength is not occupied or not allocated. The receiving component suspends sending the wavelength idle information when receiving a message, sent by the peer optical module, for requesting allocation of the first wavelength; the sending component is further configured to send a wavelength application success message to the peer optical module. The processing component is configured to set an optical port negotiation flag bit of the optical module to success when the receiving component receives a response message sent by the peer optical module, where the processing component is further configured to couple the wavelength idle message or the wavelength application success message to a data signal, so that the wavelength idle message or the wavelength application success message is sent to the peer optical module by using a data channel.

With reference to the fourth aspect, in a first possible implementation manner of the fourth aspect, the sending component is further configured to send a wavelength acknowledgment message to the peer optical module before the internal state is set.

With reference to the fourth aspect or the first possible implementation manner of the fourth aspect, in a second possible implementation manner of the fourth aspect, when the sending component and the receiving component of the local optical module are components with a tunable wavelength or capable of tuning a wavelength, the optical module sets operating wavelengths of the sending component and the receiving component according to configuration information.

With reference to the fourth aspect, in a third possible implementation manner of the fourth aspect, the wavelength idle message and the wavelength application success message are coded by means of frequency-shift keying FSK.

With reference to the fourth aspect, in a fourth possible implementation manner of the fourth aspect, the wavelength idle message and the wavelength application success message are coded in a spectrum spreading manner, and the spectrum spreading manner is used to identify that spectrum spreading is performed on original signals 0 and 1 by using a random code, and then the signals are superposed with a data signal and transmitted.

A fifth aspect provides a central office end device, including the optical module according to the fourth aspect and any possible implementation manner of the fourth aspect.

A sixth aspect provides a terminal device, including the optical module according to the third aspect and any possible implementation manner of the third aspect.

An optical module provided in the present application couples control information to a data signal, so that the optical module autonomously completes optical port auto-negotiation, so as to implement automatic wavelength negotiation and configuration of a tunable optical module without participation of a device. Therefore, an optical module provided in the present application can be used as an optical module of an existing network device or Ethernet device, and can enhance universality of a tunable optical module and lower use complexity and management and maintenance costs of a communications network.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

An optical module having an optical port auto-negotiation function and an optical port auto-negotiation method and system thereof provided in the present application are described in detail below with reference to specific embodiments.

Figure 1:
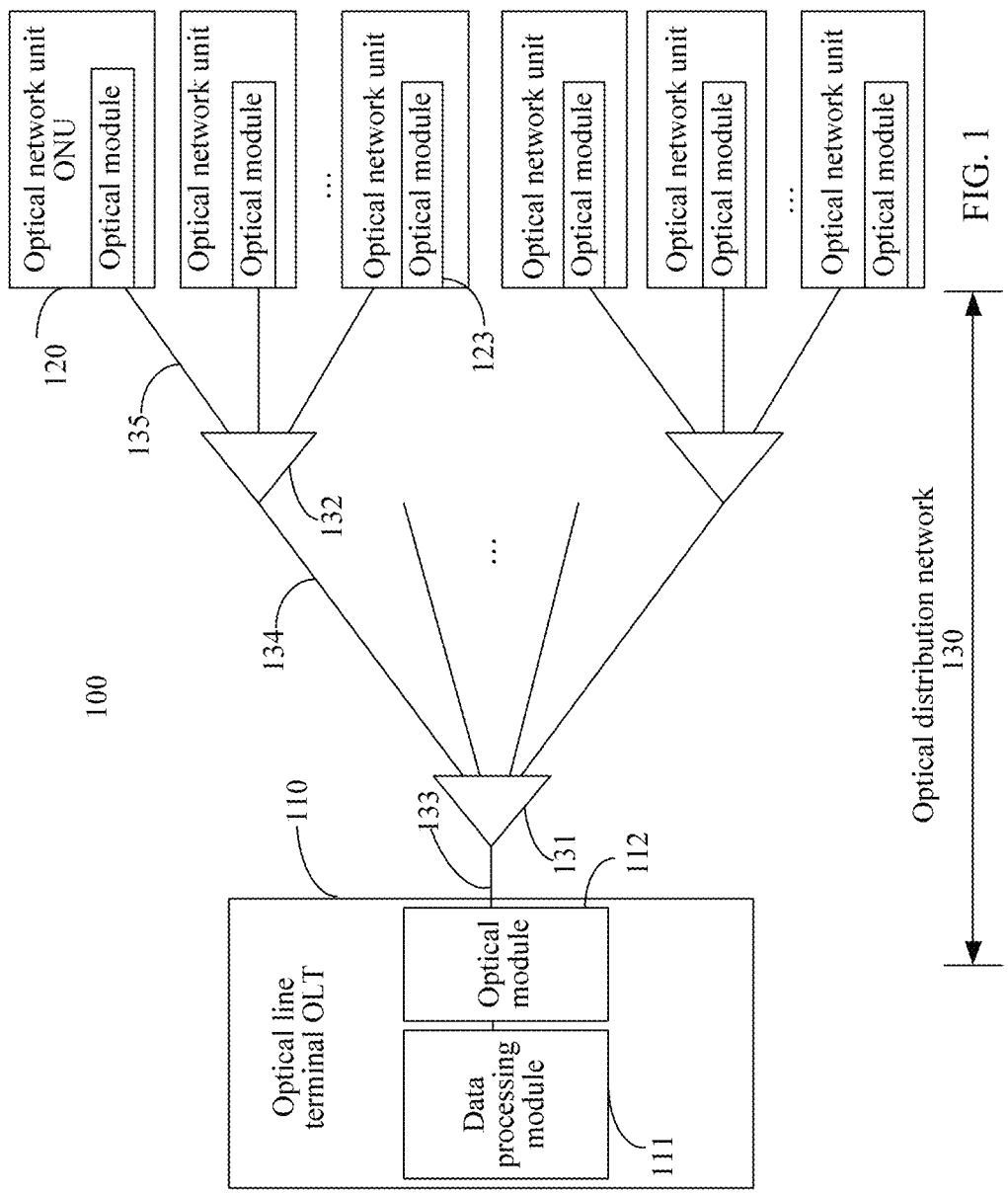
FIG. 1 is a schematic structural diagram of an existing GPON passive optical network system.

FIG. 1 is a schematic structural diagram of a GPON passive optical network system. The passive optical network system includes an optical line terminal OLT 110 and multiple optical network units ONUs 120. The OLT 110 is connected to the ONUs 120 by using an optical distribution network ODN 130. The OLT 110 further includes a data processing module 111 and an optical module 112. The data processing module may also be referred to as a MAC module and is configured to manage and control the optical module 112. The ODN 130 further includes a feeder fiber 133, a first-level splitter 131, a first-level distribution fiber 134, a second-level splitter 132, and a second-level distribution fiber 135. The ONU further includes an optical module 123 configured to receive a downstream optical signal and send an upstream optical signal.

Figure 2:
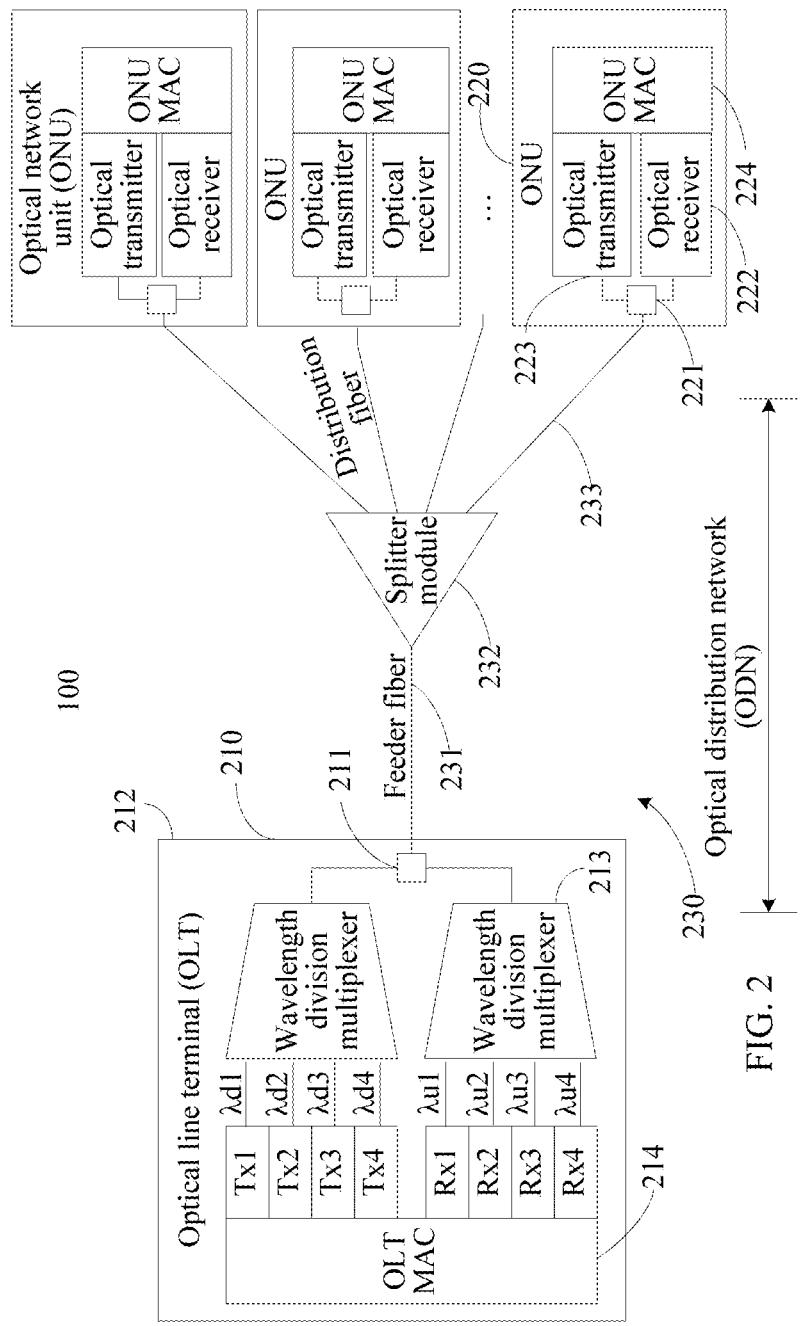
FIG. 2 is a schematic structural diagram of an existing TWDM-PON passive optical network system.
Figure 3:
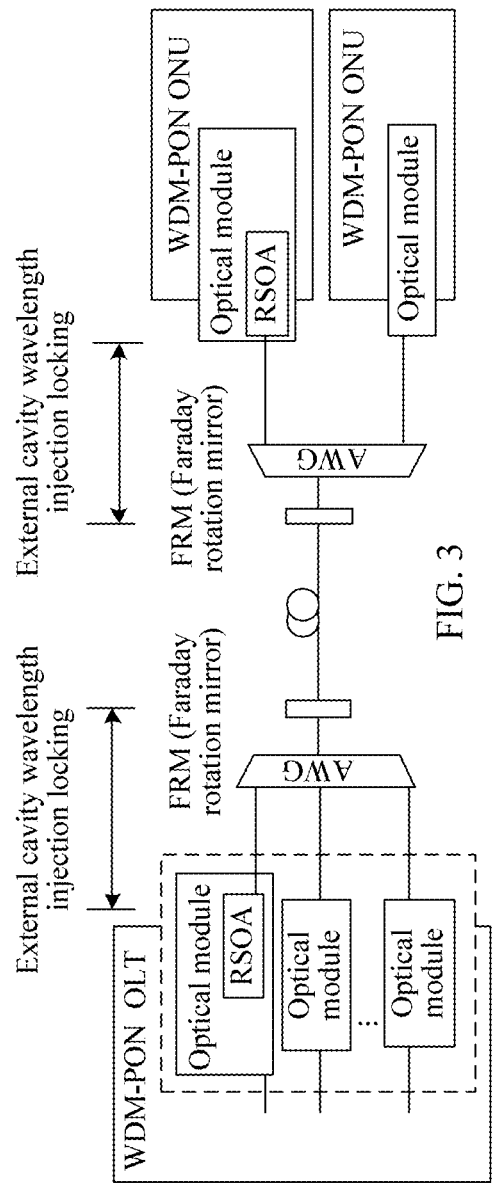
FIG. 3 is a schematic structural diagram of an existing self-seeded colorless WDM-PON passive optical network system.

FIG. 2 is a schematic structural diagram of a TWDM-PON passive optical network system. The TWDM-PON system includes an OLT 210, multiple ONUs 220, and an ODN 230. The OLT 210 is connected to the multiple ONUs 220 by using the ODN 230 in a point-to-multi-point (P2MP) manner. The multiple ONUs 220 share an optical transmission medium of the ODN 230. The ODN 230 may include a feeder fiber 231, an optical power splitter module 232, and multiple distribution fibers 233. The optical power splitter module 232 may be disposed at a remote node (RN). The optical power splitter module, on one hand, is connected to the OLT 210 by using the feeder fiber 231, and on the other hand, is connected to the multiple ONUs 220 by using the multiple distribution fibers 233. In the TWDM-PON system, communications links between the OLT 210 and the multiple ONUs 220 may include multiple wavelength channels, and the multiple wavelength channels share the optical transmission medium of the ODN 230 in a WDM manner. Each ONU 220 may operate on one of the wavelength channels in the TWDM-PON system, and each wavelength channel may bear services of one or more ONUs 220. In addition, ONUs 220 operating on a same wavelength channel may share the wavelength channel in a TDM manner. In FIG. 2, a description is provided by using an example in which the TWDM-PON system has four wavelength channels. It should be understood that in actual applications, a quantity of wavelength channels of the TWDM-PON system may further be determined according to network requirements.

For ease of description, the four wavelength channels of the TWDM-PON system in FIG. 2 are named a wavelength channel 1, a wavelength channel 2, a wavelength channel 3, and a wavelength channel 4 respectively. Each wavelength channel separately uses a pair of upstream and downstream wavelengths. For example, an upstream wavelength and a downstream wavelength of the wavelength channel 1 may be $\lambda u1$ and $\lambda d1$ respectively; an upstream wavelength and a downstream wavelength of the wavelength channel 2 may be $\lambda u2$ and $\lambda d2$ respectively; an upstream wavelength and a downstream wavelength of the wavelength channel 3 may be $\lambda u3$ and $\lambda d3$ respectively; an upstream wavelength and a downstream wavelength of the wavelength channel 4 may be $\lambda u4$ and $\lambda d4$ respectively. Each wavelength channel may separately have a corresponding wavelength channel identifier (for example, channel numbers of the foregoing four wavelength channels may be 1, 2, 3, and 4 respectively). That is, a wavelength channel identifier has a matching relationship with upstream and downstream wavelengths of the wavelength channel that are identified by the wavelength channel identifier. The OLT 210 and the ONUs 220 may learn upstream wavelengths and downstream wavelengths of wavelength channels according to wavelength channel identifiers.

The OLT 210 may include an optical coupler 211, a first wavelength division multiplexer 212, a second wavelength division multiplexer 213, multiple downstream optical transmitters Tx1 to Tx4, multiple upstream optical receivers Rx1 to Rx4, and a processing module 214. The multiple downstream optical transmitters Tx1 to Tx4 are connected to the optical coupler 211 by using the first wavelength division multiplexer 212, the multiple upstream optical receivers Rx1 to Rx4 are connected to the optical coupler 211 by using the second wavelength division multiplexer 213, and the coupler 211 is further connected to the feeder fiber 231 of the ODN 230.

Transmit wavelengths of the multiple downstream optical transmitters Tx1 to Tx4 are different. Each of the downstream optical transmitters Tx1 to Tx4 may separately correspond to one wavelength channel in the TWDM-PON system. For example, the transmit wavelengths of the multiple downstream optical transmitters Tx1 to Tx4 may be $\lambda d1$ to $\lambda d4$ respectively. The downstream optical transmitters Tx1 to Tx4 may transmit downstream data to corresponding wavelength channels by separately using the transmit wavelengths $\lambda d1$ to $\lambda d4$ thereof, so that the downstream data is received by ONUs 120 operating on the corresponding wavelength channels. Accordingly, receive wavelengths of the multiple upstream optical receivers Rx1 to Rx4 may be different from each other. Each of the upstream optical receivers Rx1 to Rx4 also separately corresponds to one wavelength channel in the TWDM-PON system. For example, the receive wavelengths of the multiple upstream optical receivers Rx1 to Rx4 may be $\lambda u1$ to $\lambda u4$ respectively. The upstream optical receivers Rx1 to Rx4 may receive, by separately using the receive wavelengths $\lambda u1$ to $\lambda u4$ thereof, upstream data sent by ONUs 220 operating on the corresponding wavelength channels.

The first wavelength division multiplexer 212 is configured to perform wavelength division multiplexing processing on downstream data that is transmitted by the multiple downstream optical transmitters Tx1 to Tx4 and that has the wavelengths of $\lambda d1$ to $\lambda d4$ respectively, and send the downstream data to the feeder fiber 231 of the ODN 230 by using the optical coupler 211, so as to provide the downstream data to the ONUs 220 by using the ODN 230. In addition, the optical coupler 211 may be further configured to provide the second wavelength division multiplexer 213 with upstream data that comes from the multiple ONUs 220 and that has the wavelengths of $\lambda u1$ to $\lambda u4$ respectively. The second wavelength division multiplexer 213 may demultiplex the upstream data of which the wavelengths are $\lambda u1$ to $\lambda u4$ to the upstream optical receivers Rx1 to Rx4 for data reception.

The processing module 214 may be a Media Access Control (Media Access Control, MAC) module. On one hand, the processing module 214 may specify operating wavelength channels for multiple ONUs 220 by means of wavelength negotiation, and provide, according to an operating wavelength channel of a particular ONU 220, the downstream optical transmitters Tx1 to Tx4 corresponding to the wavelength channels with downstream data to be sent to the ONU 220, so that the downstream optical transmitters Tx1 to Tx4 transmit the downstream data to a corresponding wavelength channel. On the other hand, the processing module 214 may further perform dynamic bandwidth allocation (DBA) for upstream transmission on the wavelength channels, to allocate upstream transmission timeslots to ONUs 220 that are multiplexed to a same wavelength channel in a TDM manner, to authorize the ONUs 220 to send upstream data by using the corresponding wavelength channel in the specified timeslots.

An upstream transmit wavelength and a downstream receive wavelength of each ONU 220 are tunable. The ONU 220 may separately adjust, according to a wavelength channel specified by the OLT 210, an upstream transmit wavelength and a downstream receive wavelength of the ONU 220 to an upstream wavelength and a downstream wavelength of the wavelength channel, so as to send and receive upstream and downstream data by using the wavelength channel.

Figure 4:
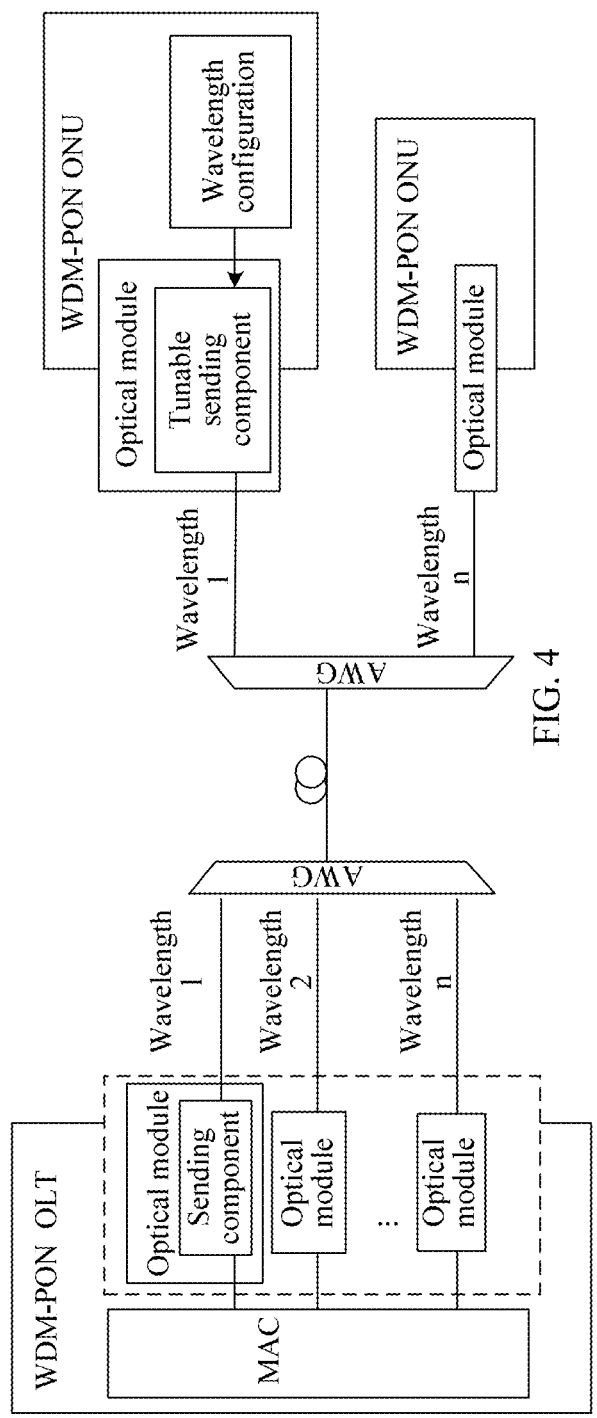
FIG. 4 is a schematic structural diagram of an existing tunable laser-based WDM-PON passive optical network system.
Figure 5:
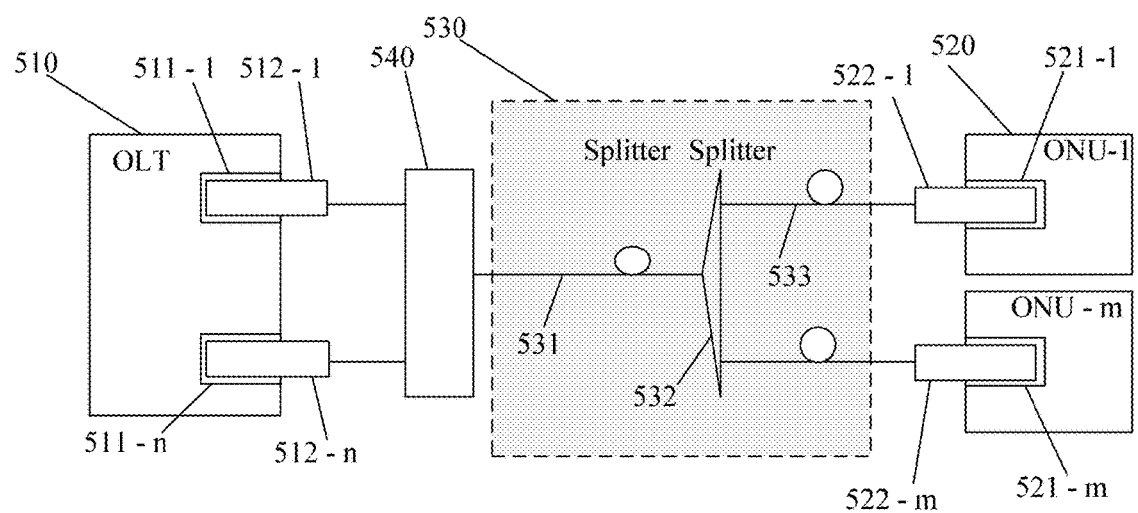
FIG. 5 is a schematic structural diagram of a PON system according to an embodiment of the present invention.

An optical module having an optical port auto-negotiation function provided in the present application is applicable to a network device connected by using a splitter-based or an optical divider-based point-to-multi-point fiber optic network. Referring to FIG. 5, FIG. 5 is a schematic structural diagram of a communications system connected by using a splitter-based point-to-multi-point fiber optic network. The communications system includes at least one or more optical line terminals OLTs 510, one or more optical network units ONUs 520, and a splitter-based point-to-multi-point optical distribution network ODN 530. The OLT may a multi-port device or a single-port device. The multi-port device refers to that multiple OLT ports are provided on one device, and the single-port device refers to that a device has only one OLT port. In a multi-port OLT device provided in FIG. 5, each port 511 may be referred to as an OLT port, an OLT service port, an OLT optic port, an OLT optical port, an optical module interface, or an interface. The OLT service port 511 provides an interface for an OLT-side optical module 512. The ONU may have one or more optic ports 521, and each optic port 521 may be referred to as an optical interface or an interface. A pluggable optical module 522 may be inserted to each interface or one or more ONU-side optical modules 522 may be installed on each interface, and the optical module provides the optical interface 521 (in this case, the optical module or functions of the optical module are integrated inside the ONU). The OLT-side optical module 512 and the ONU-side optical module 522 may be optical modules of a same type. Alternatively, a plurality of the OLT-side optical modules 512 may be integrated together. In this case, the OLT service port 511 is also referred to as a multi-path integrated OLT service port, a multi-path integrated OLT optical interface, or a multi-path integrated OLT optic port. The optical module having an optical port auto-negotiation function provided in the present application may be applied to an OLT side and may also be applied to an ONU side. The optical module having an optical port auto-negotiation function may also be applied to a WDM-PON passive optical network shown in FIG. 4.

A downstream signal of the one or more OLT-side optical modules 512 is coupled to the feeder fiber 531 by using a combiner 540. The combiner 540 may be a splitter or a WDM device, such as an AWG. An upstream signal is received by one or more OLT-side optical modules 512 after passing through the combiner 540 from the feeder fiber 531. The OLT 510 is usually located at a central position, such as a central office (CO for short), and may manage the one or more optical network units ONUs 520 at the same time. The OLT 510 may act as a medium between the ONU 520 and an upper-layer network (not shown in the figure), uses data received from the upper-layer network as downstream data, forwards the downstream data to the ONU 520 by using the ODN 530, and forwards upstream data received from the ONU 520 to the upper-layer network.

Figure 6:
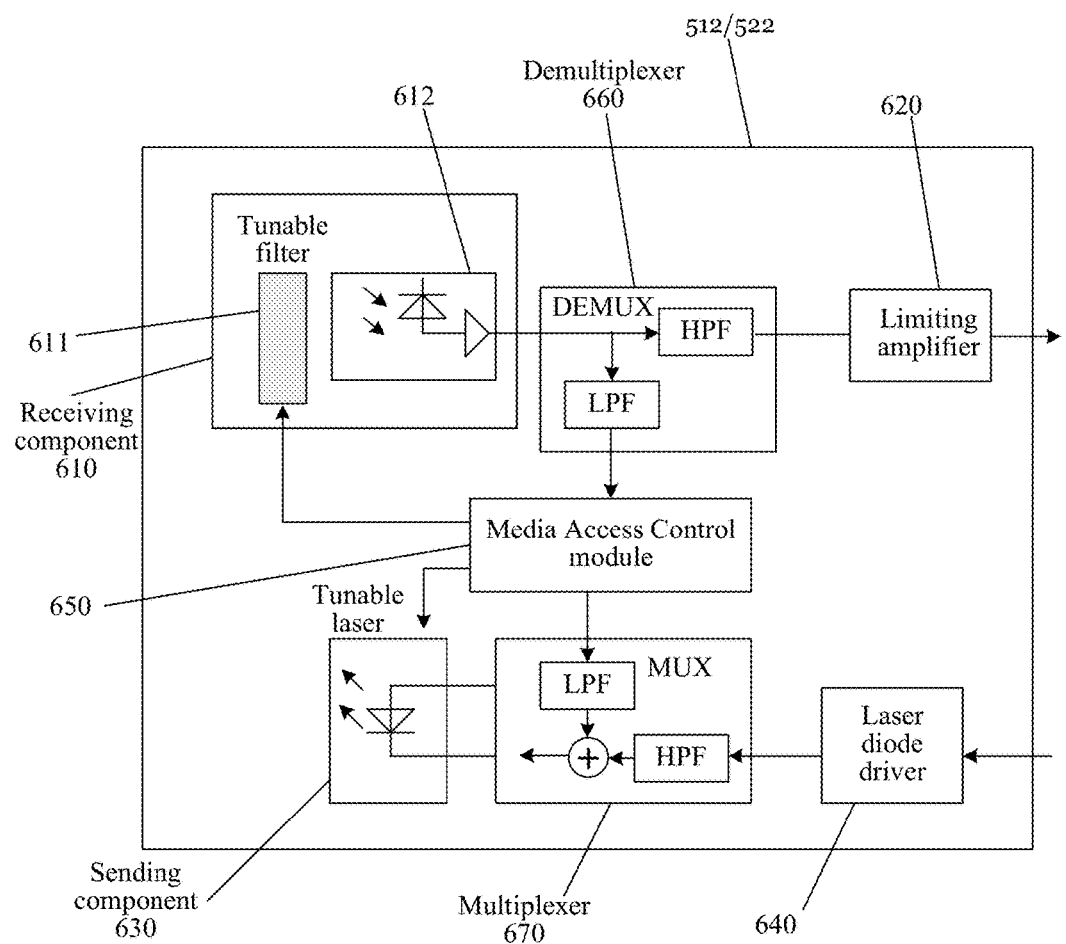
FIG. 6 is a schematic structural diagram of an optical module according to an embodiment of the present invention.

As shown in FIG. 6, in a specific implementation instance, FIG. 6 is a schematic structural diagram of the OLT-side optical module 512 or the ONU-side optical module 522. The optical module includes a receiving component 610, a limiting amplifier (LA for short) or a post amplifier (PA for short) 620, a sending component 630, a laser diode driver (LDD for short) 640, a multiplexer (MUX) 670, a demultiplexer (DEMUX) 660, and a Media Access Control (MAC for short) module 650. The receiving component is a tunable receiving component. The tunable receiving component 610 may further include a tunable filter (TF for short) 611 and a component 612 used for electrical-to-optical conversion and pre-amplification. The sending component 630 may be a tunable sending component, and mainly includes a tunable laser (TL for short).

The OLT-side optical module 512 may also be a fixed-wavelength optical module. In this case, the receiving component 610 does not include the tunable filter 611 and may include a fixed-wavelength filter. When the OLT-side optical module 512 is a fixed-wavelength optical module, the sending component 630 is also a fixed-wavelength sending component.

The MAC module (which may also be referred to as a processing component) 650 is configured to implement an optical port negotiation function between the OLT-side optical module 512 and the ONU-side optical module, including functions such as generating a local control signal, receiving a peer control signal, and processing a control signal. The control signal here may also be referred to as a control message, and refers to a message, such as a wavelength idle message, a wavelength application message, a wavelength grant message, or a wavelength acknowledgment message, exchanged between the OLT-side optical module 512 and the ONU-side optical module in the following specific embodiments. Messages that are sent or received by the optical modules at two sides in a negotiation process and that are relevant to wavelength negotiation can all be understood as control signals. The control signal may independently exist (this is mainly the case in a phase when a data receiving and/or sending function of the system has not been started after the optical module just powers on, the optical module is just inserted into an optical interface, or the system is reset), may be coupled, in a form of a low-frequency signal, with a data signal, may be coupled, in a form of a high-frequency signal, with a data signal, or may be coupled with a data signal in a manner of being superposed at the top of the data signal, that is, amplitude modulation is performed on the data signal.

In the OLT-side optical module 512, the multiplexer 670 is configured to multiplex a downstream control signal and a downstream data signal that are generated by the processor 650. The demultiplexer 660 is configured to separate an upstream data signal and a control signal that are sent by the ONU optical module 522 at the ONU.

In the ONU-side optical module 522, the multiplexer 670 is configured to multiplex an upstream control signal and an upstream data signal that are generated by the processor 650. The demultiplexer 660 is configured to separate a downstream data signal and a control signal that are sent by the OLT-side optical module 522.

Optionally, the multiplexer 670 may be a frequency combiner and couples, in a frequency domain, a data signal driven by the LDD 640 with the control signal generated by the processor 650. For example, when a control signal may be a low-frequency signal of 0 to 10 MHz, the multiplexer 670 multiplexes the low-frequency control signal and a high-frequency data signal in the frequency domain.

Optionally, the multiplexer 670 includes a high pass filter (HPF for short) and a low pass filter (LPF for short), which are respectively configured to filter a data signal and a control signal before coupling.

Optionally, the HPF or the LPF may also be implemented outside the multiplexer 670. For example, the HPF is implemented in the LDD 640, and the LPF may be implemented in the processor 650.

Optionally, when the sending component 630 is current-driven, the LDD 640 provides a drive current for a data signal, and the processor 650 provides a drive current for a control signal. In this case, the multiplexer 670 may be omitted, or only the drive current of the LDD 640 and the drive current of the processor 650 are superposed to drive the sending component 630. In this case, the LDD 640 and the processor 650 are connected to a cathode or an anode of the sending component 630.

Optionally, when the sending component 630 is voltage-driven, the LDD 640 provides a drive voltage for a data signal, and the processor 650 provides a drive voltage for a control signal. In this case, the multiplexer 670 is configured to superpose voltage signals, and then directly drive the sending component 630 or drive the sending component 630 by using an extra circuit.

Optionally, the multiplexer 670 may be integrated in a laser diode driver. When the sending component 630 is current-driven, the laser diode driver outputs a hybrid drive current signal to drive the cathode or anode of the sending component 630. When the sending component 630 is voltage-driven, the laser diode driver outputs a hybrid drive voltage signal to drive the sending component 630.

Optionally, the demultiplexer 660 is configured to decouple the data signal and the control signal received by the receiving component 610. Optionally, the demultiplexer 660 includes an HPF and an LPF. Optionally, the HPF or LPF may also be implemented outside the demultiplexer 660. For example, the HPF may be implemented in the limiting amplifier LA or the post amplifier 620, and the LPF may be implemented in the processor 650.

Optionally, the demultiplexer 660 may be integrated in the limiting amplifier LA or the post amplifier 620.

Optionally, the OLT-side optical module 512 may use the receiving component 610 and the sending component 630 that have fixed wavelengths.

Optionally, the OLT-side optical module 512 may use the receiving component 610 and the sending component 630 that have tunable wavelengths.

In one embodiment, a status machine of the OLT-side optical module 512 for implementing optical port auto-negotiation with the ONU-side optical module 522 is as follows: the status machine includes three states: state 1 is a wavelength idle state, which indicates that a wavelength used by the optical module has not been allocated to any ONU, or after being powered on or reset, the optical module has not performed optical port auto-negotiation with any optical module; state 2 is a wavelength pre-occupied state, and this state indicates that the optical module is performing optical port auto-negotiation with an ONU-side optical module, but has not completed the negotiation process, that is, wavelength allocation negotiation is being performed; state 3 is a wavelength occupied state, and it indicates that in this state, the optical module has successfully completed an optical port auto-negotiation function with an ONU-side optical module.

Specifically, the OLT-side optical module provided in the present invention includes: a sending component 630, a receiving component 610, and a processing component 650.

The sending component 630 periodically sends a wavelength idle message to a peer optical module and listens in an upstream direction by using the receiving component 610. The wavelength idle message is used to identify that a first wavelength is an idle wavelength, or a first wavelength is not occupied or not allocated.

The receiving component 610 suspends sending the wavelength idle information when receiving a message, sent by the peer optical module, for requesting allocation of the first wavelength.

The sending component 630 is further configured to send a wavelength grant message to the peer optical module.

The processing component 650 is configured to set an internal state when the receiving component 610 receives a response message sent by the peer optical module, and the setting is used to identify completion of wavelength negotiation. The processing component 650 is further configured to generate control messages such as the wavelength idle message or the wavelength grant message, and finally, these control signals are sent to the peer optical module.

Further, the wavelength idle message is used to indicate that the wavelength has not been allocated to any ONU, or after being powered on or reset, the optical module has not performed optical port auto-negotiation with any optical module. The wavelength grant message is used to indicate that the optical module is currently performing optical port auto-negotiation with an ONU-side optical module, but has not completed a negotiation process, that is, wavelength allocation negotiation is being performed.

Optionally, the receiving component 610 is further configured to receive a wavelength negotiation success message in the upstream direction. The wavelength negotiation success message is used to indicate that the optical module has successfully completed an optical port auto-negotiation function with an ONU-side optical module.

Optionally, the sending component is further configured to send a wavelength acknowledgment message to the peer optical module before the internal state is set.

Figure 7:
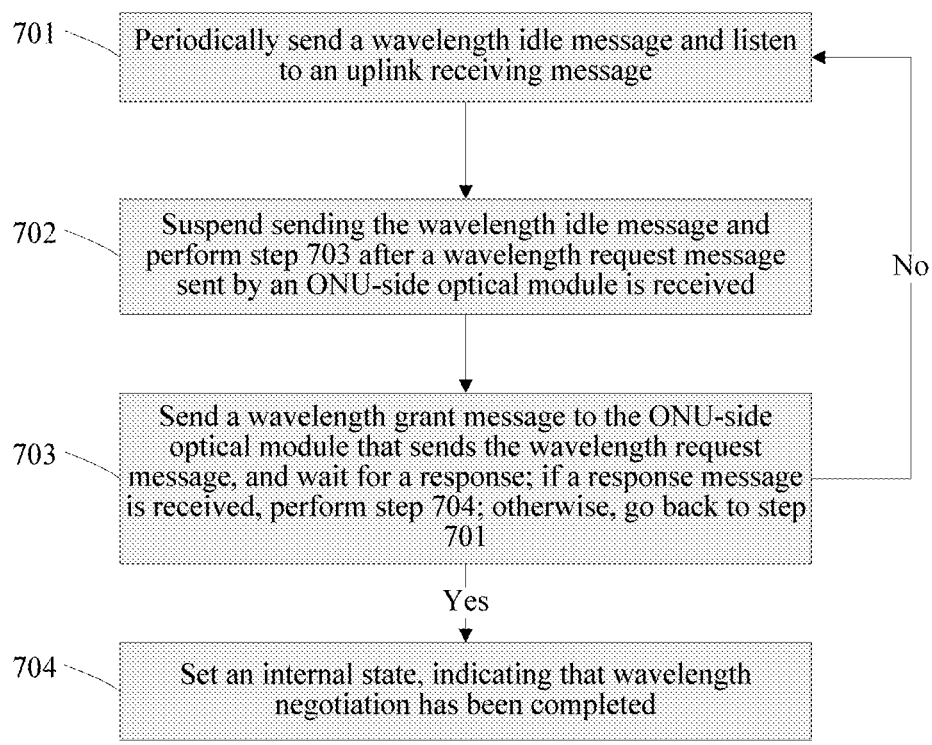
FIG. 7 is a flowchart of optical port auto-negotiation of an OLT-side optical module according to an embodiment of the present invention.

Accordingly, as shown in FIG. 7, an optical port auto-negotiation processing process of the OLT-side optical module using the receiving component 610 and the sending component 630 that have fixed wavelengths includes:

Step 701: Periodically send a wavelength idle message and listen to an upstream receiving message, where the wavelength idle message is used to identify that a wavelength is an idle wavelength, or a wavelength is not occupied or not allocated.

Step 702: Suspend sending the wavelength idle information and perform a next step 703, after a wavelength request message sent by an ONU-side optical module is received.

Step 703: Send a wavelength application success message to the ONU-side optical module that sends the wavelength request message, where the wavelength application success message is used to identify a message that the wavelength has been pre-occupied, wait for a response, and if a response message is received, perform step 704; otherwise, go back to step 701.

Step 704: Set an internal state, indicating that wavelength negotiation has been completed, where the wavelength application message or the response message is coupled to a data signal and is sent to the peer optical module by using a data channel.

Optionally, in step 704, before or after the internal state is set, a wavelength acknowledgment message may be further sent to the ONU-side optical module.

Before a state 701, the OLT-side optical module 512 needs to set a to-be-sent wavelength of the tunable sending component 630 and/or a receive wavelength of the tunable receiving component 610 according to configuration information. The configuration information is delivered to the OLT-side optical module 512 by an OLT device by using an interface between the OLT device and the OLT-side optical module. The configuration information may be one or more registers in the OLT optical module 512 or one or more configuration bits in one or more registers.

A sent and/or received message in the auto-negotiation processing process is referred to as a negotiation or an interaction message. Optionally, a coding mode of an interaction message may use a frequency-shift keying (FSK) form. That is, in a particular period, a first frequency f0 is used to represent a signal "0", and a second frequency f1 is used to represent a signal "1". For example, 1 MHz is used to represent "0", 1.5 MHz is used to represent "1", and each "0" and "1" last duration of 1 ms (a data transmission rate of a control channel is 1 Kbps). The interaction message and a data signal are superposed in a frequency domain and then transmitted, or the interaction message is transmitted after amplitude modulation is performed on a data signal by using the interaction message, or the interaction message is directly transmitted.

A coding mode of each interaction message may be represented by using a particular frequency signal. For example, the wavelength idle message is represented by using a signal whose frequency is f0 (for example, f0=2 MHz); a message indicating that a wavelength is occupied is represented by using a signal whose frequency is f1.

Further, the coding mode of the interaction message may be implemented in a spectrum spreading manner. That is, spectrum spreading is performed on original signals "0" and "1" by using a random code, and then the signals are superposed with a data signal and transmitted, or the signals after the spectrum spreading are directly transmitted.

In one embodiment, when the ONU-side optical module 522 uses the receiving component 610 and the sending component 630 that have tunable wavelengths, a status machine of the ONU-side optical module 522 implementing optical port auto-negotiation with the OLT-side optical module 512 is as follows: the status machine includes four states: State 1 is an initial state and is used to represent a state that the ONU-side optical module 522 enters after being powered on or reset, or a state that the ONU-side optical module 522 enters after being powered on and enabled. In this state, the processing module selects a wavelength according to a particular algorithm rule (for example, random selection or a method according to ascending order of channels) and configures a tunable receiving component to the selected receive wavelength. That is, the tunable receiving component may receive a downstream control signal of the selected wavelength. State 2 is a wavelength hunt state. In this state, the optical module 522 listens to a downstream control message on the selected downstream wavelength. If no wavelength idle message is received within a specified time, return to the state 1; otherwise, enter state 3. State 3 is a wavelength pre-locking state, which indicates that in this state, the optical module 522 has detected that a wavelength corresponding to a particular OLT-side optical module 512 is not occupied, or indicates an application to use a corresponding wavelength. State 4 is a wavelength locked state, which indicates that the ONU-side optical module 522 has locked a wavelength corresponding to a particular OLT-side optical module 512, or indicates that optical port auto-negotiation has been completed.

Specifically, the ONU-side optical module specifically includes: a sending component 630, a processing component 650, and a receiving component 610.

The receiving component 610 is configured to select a downstream to-be-received wavelength.

The processing component 650 is configured to listen to a downstream message on the selected downstream to-be-received wavelength, and if a wavelength idle message from a peer optical module is received, send a wavelength application message on an upstream wavelength corresponding to the downstream to-be-received wavelength by using the sending component 630.

Optionally, the processing component 650 may be further configured to set an optical port negotiation success flag bit of the optical module when the receiving component 610 receives a wavelength grant message in a downstream direction.

The wavelength application message is used to indicate that the ONU-side optical module applies to the OLT-side optical module for use of an idle wavelength or wavelength resource, or indicate that the ONU-side optical module is in a wavelength pre-locking state.

Optionally, the sending component 630 is further configured to send a response message to the peer optical module. The response message is used to indicate that the ONU-side optical module is in a wavelength pre-locking state. The processing component 650 is further configured to couple the wavelength application message or the response message to a data signal and send the wavelength application message or the response message to the peer optical module by using a data channel, or directly send the wavelength application message or the response message to the peer optical module.

Optionally, the optical module further includes a storage component. The storage component is configured to store a correspondence between upstream wavelengths and downstream wavelengths.

Figure 8:
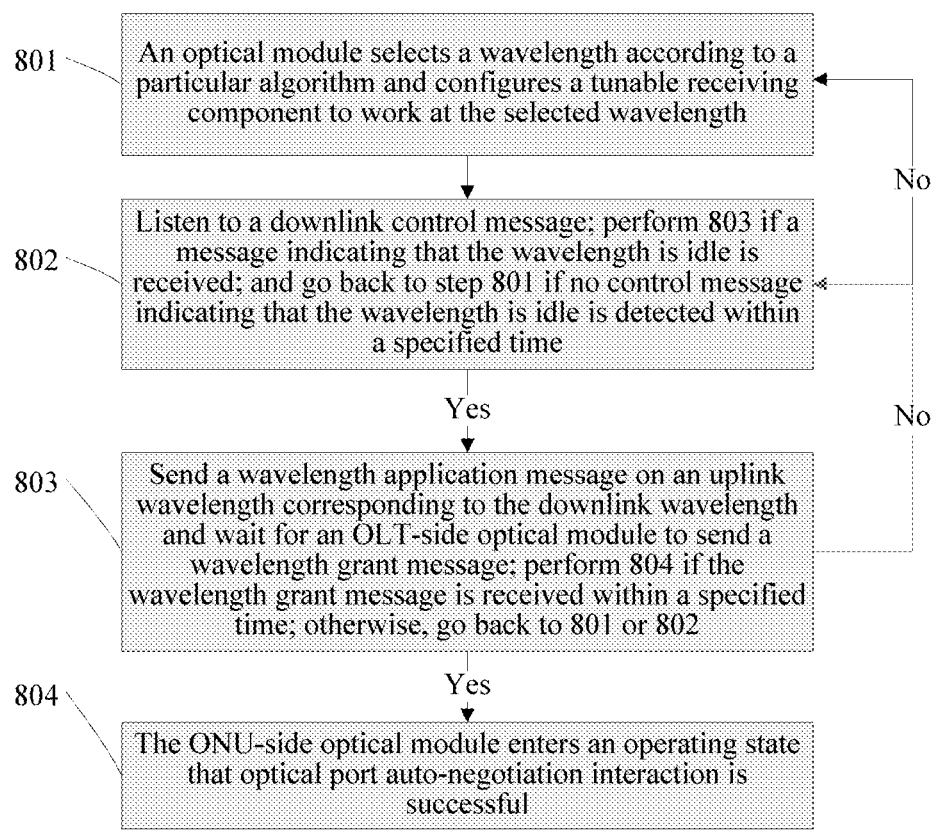
FIG. 8 is a flowchart of optical port auto-negotiation of an ONU-side optical module according to an embodiment of the present invention.

Accordingly, as shown in FIG. 8, the optical port auto-negotiation processing interaction process that uses the ONU-side optical module 522 and the OLT-side optical module 512 includes:

Step 801: The optical module 522 selects a wavelength according to a particular algorithm specification and configures a tunable receiving component to work at the selected wavelength.

Step 802: Listen to a downstream message on the downstream to-be-received wavelength; perform 803 if a wavelength idle message from the OLT-side optical module is received; and return to step 801 if no wavelength idle message indicating that a wavelength is idle is detected within a specified time T1.

Step 803: Send a wavelength application message on an upstream wavelength corresponding to the downstream wavelength and wait for the OLT-side optical module 512 to send a wavelength grant message; perform 804 if the wavelength grant message is received within a specified time T2; otherwise, go back to 801 or 802.

Step 804: The ONU-side optical module 522 enters an operating state that optical port auto-negotiation interaction is successful and sets an optical port auto-negotiation interaction completion flag bit; or enters an operating state that optical port auto-negotiation interaction is successful, after sending a response message to the OLT-side optical module 512, and sets an optical port auto-negotiation interaction completion flag bit. The wavelength application message or the response message is coupled to a data signal and sent to a peer optical module by using a data channel. The wavelength application message is used to identify that a first optical module requests a second optical module to allocate the wavelength, and the wavelength grant message is used to identify that the second optical module allocates the wavelength to the first optical module.

Further, an ONU device may read the optical port auto-negotiation completion flag bit by using an interface between the ONU device and the optical module 522. If it is determined that the flag bit has been set, it indicates that interaction has been completed or wavelength negotiation has been completed, and then receiving and/or sending of a data signal may be started.

In the 803, the upstream wavelength corresponding to the downstream wavelength or a correspondence between upstream wavelengths and downstream wavelengths is stored in the optical module 522 in a form of a table. The correspondence may be agreed upon in advance, or may be dynamically configured by the ONU device by using an interface between the ONU device and the ONU-side optical module 522, or may be delivered to a processor of the ONU-side optical module 522 by using a control message indicating that the wavelength is idle.

Optionally, if the correspondence between upstream wavelengths and downstream wavelengths is agreed upon in advance or dynamically configured, the optical module 522 may set an operating wavelength or a to-be-sent wavelength of a tunable sending component at any moment before sending the wavelength application message, for example, the operating wavelength or to-be-sent wavelength is set in step 801 or step 802.

Optionally, if the correspondence between upstream wavelengths and downstream wavelengths is delivered by using the wavelength idle message, an operating wavelength or an upstream wavelength of a tunable sending component may be set after the wavelength idle message is received and before the wavelength application message is sent.

In the 803, if no wavelength application acknowledgment message is received within the specified time T2, further determining may be performed. If a specified number of times for sending a wavelength application control message on a Nth wavelength is less than a specified numerical value, jump to step 802; this indicates that a wavelength application attempt still needs to be made on the specified $N^{th}$ wavelength. Otherwise, jump to step 801; this indicates that the wavelength application is still unsuccessful after a specified quantity of attempts are made on the specified $N^{th}$ wavelength, and an attempt of applying for another wavelength still needs to be made by going to 801.

The message indicating that a wavelength is idle may be an SN-Request message in a broadcast or multicast form and is broadcast or multicast to all ONU-side optical modules 522 that can receive the wavelength, to request the modules to report an SN.

The message indicating the wavelength application may be an SN-Response message, such as an SN number of a reporting optical module 522, or may be any identifier information or code information that can uniquely identify optical module.

The message indicating wavelength application acknowledgment may be an SN-Request message in a unicast form, for example, a message having an SN of a particular optical module 522.

The response message may be an SN-Response message, such as reporting an SN number of the optical module 522, or may be any identifier or coding information that can uniquely identify optical module information.

Figure 9:
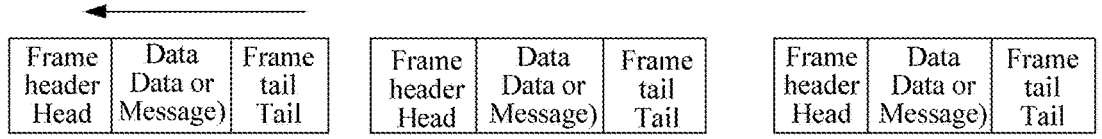
FIG. 9 is a schematic diagram of a frame format of a control message according to an embodiment of the present invention.
Figure 10:
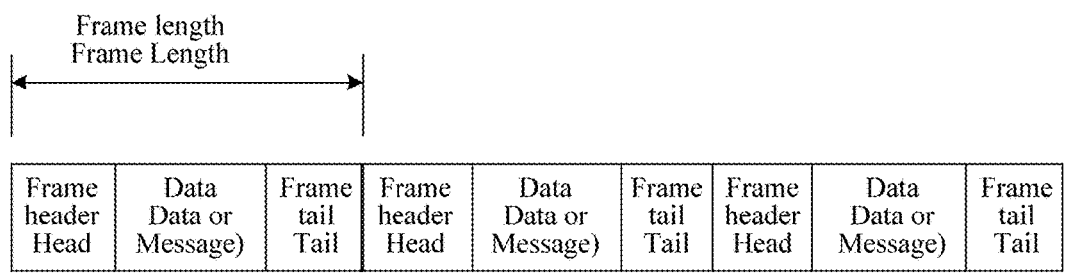
FIG. 10 is a schematic diagram of another frame format of a control message according to an embodiment of the present invention.

In a specific implementation manner, a frame structure of a message indicating that a wavelength is idle, a message indicating that a wavelength is occupied, or another message that is sent in a downstream direction is shown in FIG. 9 and FIG. 10. The frame includes a frame header field and a data field. The data field may be referred to as a control message field. The frame may further include a frame tail.

The frame may be sent in a burst manner. As shown in FIG. 9, frames may not be connected, and no control message is delivered between two frames. Frames may also be sent in a continuous manner, as shown in FIG. 10. Frames are connected or are padded with idle frames. A length of the message frame may be fixed or variable.

Figure 11:
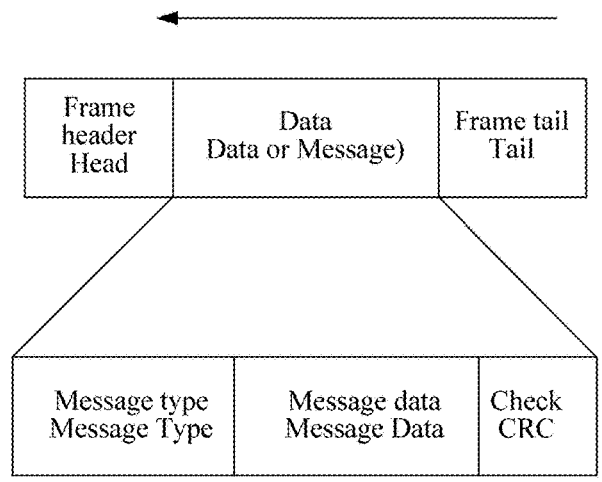
FIG. 11 is a schematic diagram of another frame format of a control message according to an embodiment of the present invention.

As shown in FIG. 11, when the message frame has a fixed length, a data field includes a message type field and a message data field, and may further include a check field. The check field may be a cyclic redundancy check field, a bit parity check field, or a check field of another type. The message data field includes message data of fixed bytes.

Figure 12:
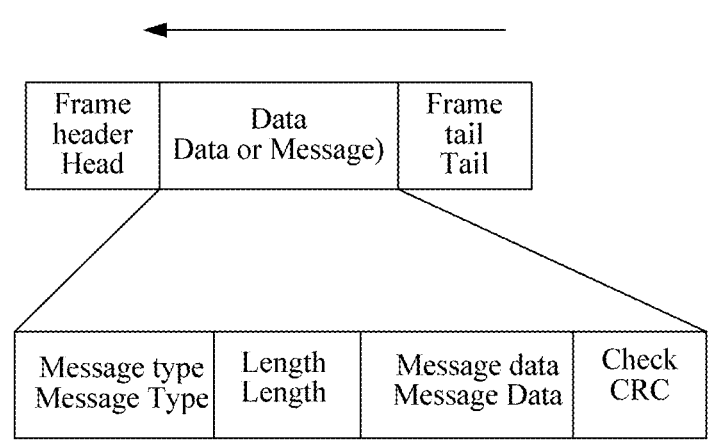
FIG. 12 is a schematic diagram of another frame format of a control message according to an embodiment of the present invention.

In another specific implementation manner, as shown in FIG. 12, when the message frame has an unfixed length or a variable length, the data field includes a message type field, a length field, and a message data field, and may further include a check field. The check field may be a cyclic redundancy check field, a bit parity check field, or a check field of another type. A length of the message data field is specified by the length field.

The message type field may further include one or more fields. One field may be used to describe that the message is a broadcast message, a multicast message, or a unicast message. Specifically, when the message type field is described by using one byte and has only one field, "0x01", "0x02", "0x03", and the like are used to represent the foregoing broadcast or multicast SN-Request, unicast SN-Request, SN-Response, and the like respectively. Alternatively, the messages may also be represented by using two fields: higher four bits are used to represent broadcast/multicast, or unicast, and lower four bits represent a specific message type. For example, "0x11" and "0x01" represent the broadcast or multicast SN-request and unicast SN-Request respectively.

The message data field may further include one or more fields, for example, a local to-be-sent wavelength field, a local to-be-received wavelength field, or an expected to-be-received wavelength field. The local to-be-sent wavelength field is used to deliver, to a peer optical module, a wavelength sent by a local optical module. The local to-be-received wavelength field or the expected to-be-received wavelength field is used to deliver, to the peer optical module, a wavelength of an optical signal received by the local optical module or a wavelength of an optical signal expected to be sent by the peer end. Alternatively, the message data field consists of one or more TLV (type Type, length Length, and value Value) structures. Each TLV structure represents an attribute, a parameter, a configuration, or performance monitoring that is to be exchanged between an OLT-side optical module and an ONU-side optical module, and includes three fields: T, L, and V. The field T represents an information type of the TLV structure, the field L represents an information length, and the field V represents specific data, content, information, or the like to be delivered.

Specifically, when a local end is an OLT-side optical module, a control message sent to a peer ONU-side optical module may include the local to-be-sent wavelength field or a TLV field, and/or the local to-be-received wavelength field, the expected to-be-received wavelength field, or a TLV field. A description is provided here by using an SN-Request message as an example. The local to-be-sent wavelength field is used to notify the ONU-side optical module of downstream wavelength information sent by the OLT-side optical module. The local to-be-received wavelength field or the expected to-be-received wavelength field is used to notify the ONU-side optical module of a wavelength of an optical signal to be sent. If the ONU-side optical module plans to respond to the SN-Request message, the ONU-side optical module first adjusts a tunable laser to send a wavelength specified by the local to-be-received wavelength field or the expected to-be-received wavelength field in the SN-Request message, and then sends an SN-Response message to the OLT-side optical module.

Specifically, when a local end is an ONU-side optical module, a message sent to a peer OLT-side optical module may include the local to-be-sent wavelength field and/or the local to-be-received wavelength field or the expected to-be-received wavelength field. A description is provided here by using an SN-Response as an example. The local to-be-sent wavelength field is used to deliver, to the OLT-side optical module, wavelength information of an optical signal sent by the local ONU optical module. The local to-be-received wavelength field or the expected to-be-received wavelength field is used to deliver, to the peer OLT-side optical module, wavelength information of an optical signal received by the local ONU-side optical module.

Further, the wavelength information may be expressed in any one of the following three manners:

In the first manner, the wavelength information is expressed by using an absolute value. For example, if a sent wavelength is 1310.12 nm, a value of the local to-be-sent wavelength field may be 131012, and the last two digits are decimals by default. In this case, three bytes need to be used to deliver one piece of wavelength information.

In the second manner, the wavelength information is expressed by using a relative value. The wavelength information is a difference relative to a reference wavelength. The reference wavelength is set to 1300 nm. Assuming that a sent wavelength is 1310.12 nm, a value of the local to-be-sent wavelength field may be 131012−130000=1012, where two latter digits indicate decimals. Because current communications wavelengths are all below 1670 nm, in this case, one piece of wavelength information may be delivered by using only two bytes.

In the third manner, the wavelength information is expressed by using a channel number. In this case, a wavelength needs to be pre-numbered or a channel for standardizing a wavelength is used to describe wavelength information. For example, it is agreed that 1310.12 nm is a channel 1, and 1311.55 nm is a channel 3. If a channel number is used for description, when a value of the local to-be-sent wavelength field is 1, it indicates that a local to-be-sent wavelength is 1310.12 nm. When a value of the local to-be-sent wavelength field is 3, it indicates that the local to-be-sent wavelength is 1311.55 nm.

Because spectral widths of different types of lasers may be different, when the OLT-side and ONU-side optical modules use lasers of different spectral widths, a problem of interference between adjacent wavelengths or in a same channel may exist. It is assumed that there are multiple optical modules at an OLT side, and a wavelength interval between optical modules may be 100 GHz, that is, a 100-GHz channel interval is supported. If a spectral width of a laser of an ONU-side optical module is greater than 100 GHz, an optical signal exceeding a channel interval leaks to an adjacent channel. Therefore, when the ONU-side optical module sends data or a control message to an OLT-side optical module, communication between another ONU-side optical module and a corresponding OLT-side optical module is interfered. To resolve the problem, the message data field may further include: an allowed laser spectral width field, a channel interval field, or a system type field. When control management information delivered by the OLT-side optical module to the ONU-side optical module includes an allowed laser spectral width field, assuming a value thereof is 0.4 (representing 0.4 nm), it indicates that only an ONU-side optical module whose laser spectral width is less than 0.4 nm is allowed to respond to the control message of the OLT-side optical module. When a control message delivered by the OLT-side optical module to the ONU-side optical module includes a channel interval field, assuming that a value thereof is 100 (indicating that a channel interval is too GHz), it indicates that only an ONU-side optical module applicable to a 100-GHz channel interval is allowed to respond to the control message of the OLT-side optical module. When a control message delivered by the OLT-side optical module to the OLT-side optical module includes a system type field, assuming that a value thereof is 1 (it is assumed that 1 represents coarse wavelength division multiplexing; 2 represents dense wavelength division of a 100 G channel interval; 3 represents dense wavelength division of a 50 G channel interval; . . . ), it indicates that only an ONU-side optical module applicable to a coarse wavelength division multiplexing system is allowed to respond to the control message of the OLT-side optical module.

More specifically, a description is provided by using the broadcast or multicast SN-Request message sent by the OLT-side optical module to the ONU-side optical module as an example. It is assumed that the broadcast or multicast SN-Request message sent by the OLT-side optical module includes an allowed laser spectral width field indicating that an allowed laser spectral width is 0.4 nm. After detecting the message, the ONU-side optical module determines, according to the allowed laser spectral width field, whether a local laser spectral width exceeds 0.4 nm. If the local laser spectral width exceeds 0.4 nm, the ONU-side optical module does not respond to the broadcast or multicast SN-Request message. If the local laser spectral width is less than 0.4 nm, the ONU-side optical module responds to the peer OLT optical module, and sends an SN-Response message on a wavelength configured by the ONU-side optical module, configured by the OLT-side optical module, or selected by the OLT-side optical module.

When a message frame has a fixed length, specific structures of several messages for optical port auto-negotiation between the OLT-side optical module and the ONU-side optical module are described below by using examples. Actual message structures may also include only some of the fields.

In the broadcast or multicast SN Request message, as shown in Table 1, the message type may be expressed by using one field. For example, "000000001" indicates that the message is a broadcast or multicast SN-Request message, or the message type is expressed by using two fields. Higher four bits indicate that the message is a broadcast or multicast message or is a unicast message (0001 here represents a broadcast or multicast message), and lower four bits indicate that the message type is SN-Request message. When the message type is expressed by using two fields, if a first byte is "00000001", it indicates that the message is a unicast SN-Request. If the first byte is "00010001", it indicates that the message is a broadcast or multicast SN-Request message.

TABLE 1

Broadcast or Multicast SN Request Message

| Byte (Octet) | Content (content) | Description (Description) |
|---|---|---|
| 1 | 0x01 or 0x11 | A message type, indicating that the message is a broadcast or multicast SN-Request message |
| 2-4 | 149011 | A sent wavelength is 1490.11 nm |
| 5-7 | 155022 | An expected to-be-received wavelength is 1550.22 nm |
| 8 | 1 | A coarse wavelength division multiplexing module with a channel interval of 20 nm 1 represents a channel interval of 20 nm 2 represents a channel interval of 10 nm . . . 20 represents a channel interval of 0.8 nm 21 represents a channel interval of 0.4 nm . . . |
| 9-24 | Undefined | Undefined |

TABLE 2

SN Response Message Format

| Byte (Octet) | Content (content) | Description (Description) |
|---|---|---|
| 1 | 0x02 | A message type, indicating that the message is a SN-Response |
| 2-4 | 155022 | A sent wavelength is 155022 nm |
| 5-7 | 149011 | A received wavelength is 1490.11 nm |
| 8 | 1 | A coarse wavelength division module with a channel interval of 20 nm 1 represents a channel interval of 20 nm 2 represents a channel interval of 10 nm . . . 20 represents a channel interval of 0.8 nm 21 represents a channel interval of 0.4 nm . . . |
| 9-24 | XXXXX . . . XX | An SN number or an identifier (16 bytes) of an ONU-side optical module |

In the control message frame, a random code may be used to express "0" and "1" in the message frame, or in other words, a control message frame is coded by using a random code, or spectrum spreading is performed on a control message frame by using a random code. Content in the frame header field may be expressed by using PNm. Content in the data field is expressed by using PNn. For example, "0" is expressed by using PNn, and "1" is expressed by using –PNn (–PNn refers to a signal negating a PNn signal). The PN refers to a random code, and subscripts n and m each represent a length of the random code PN. The length m of the random code representing data in the frame header field may be different from the length n of the random code representing data content in the data field. When m is not equal to n, one bit (which may be 0 or 1, that is, one PNm or –PNm may be used) may be used to represent the frame header. When m=n, multiple bits (for example, four bits "1010") may be used to represent the frame header.

Figure 13:
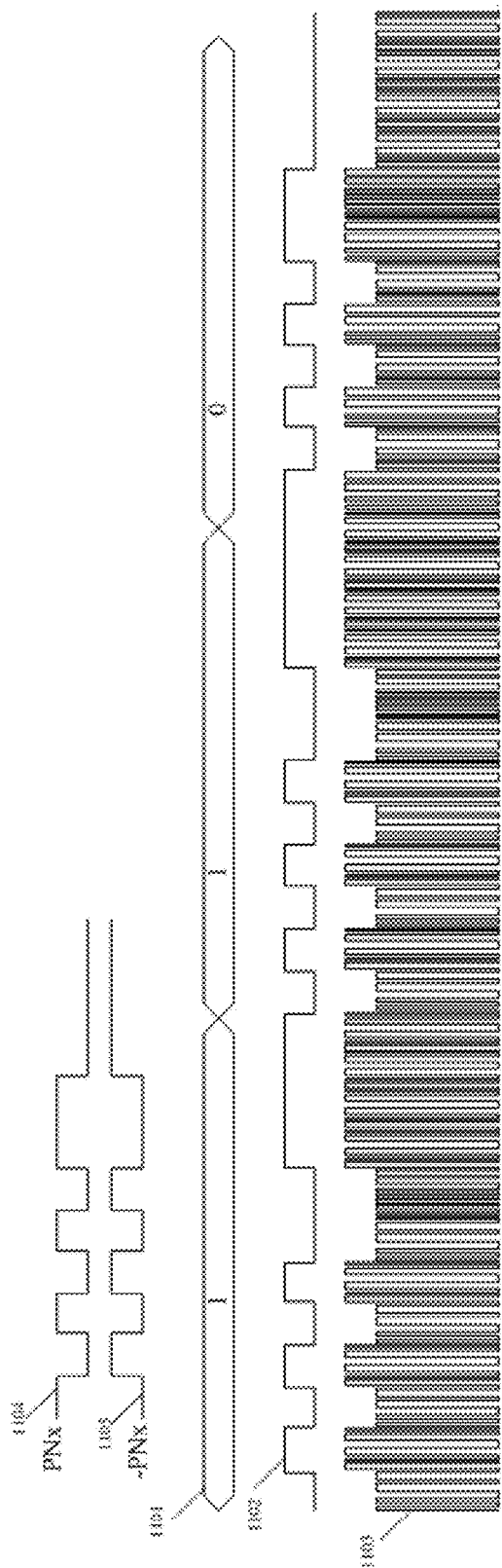
FIG. 13 is a schematic diagram of expressing a control message frame by using a random code according to an embodiment of the present invention.

Specifically, as shown in FIG. 13, a random code (such as a pseudo-random code) is used to represent a control message frame. 1101 is a binary representation of a message frame generated by a control functional module. A description is provided by using three bits "110" as an example. The message frame is coded by using a random code, to generate a coded sequence 1102 "PNx, PNx, −PNx", where PNx represents "1", and −PNx represents "0". A signal generated after the message frame is coded by using the random code is further used to perform amplitude re-modulation on a data signal, to generate a signal 1103 to be finally transmitted in an optical fiber.

When the control message frame is coded by using a random code, random sequences of different lengths may be used to represent "1" and "0" respectively. For example, PNa is used to represent "1", PNb is used to represent "0", and lengths of two random codes PNa and PNb are different.

The control message frame may also be coded by using a frequency signal, or in other words, frequency modulation is performed on the control message frame by using a frequency signal. The frequency signal may be a square-wave frequency signal or a sine-wave frequency signal. A frame header field and a data field in the control message frame may be coded or frequency-modulated by using a same frequency signal, or may be coded or frequency-modulated by using different frequency signals. For example, "1" and "0" in the frame header field may be represented by using signals of 1 KHz and 1.5 KHz respectively. "1" and "0" in the data field are represented by using signals of 4 KHz and 3 KHz respectively. "1" and "0" in the frame header field and the data field may be represented by using signals of 1 KHz and 1.5 KHz respectively. When the frame header field and the data field are expressed by using different frequency signals, a frame header may also be represented by using a frequency of only a period of time. For example, the frame header is represented by using a 10-KHz signal of 10 ms.

Figure 14:
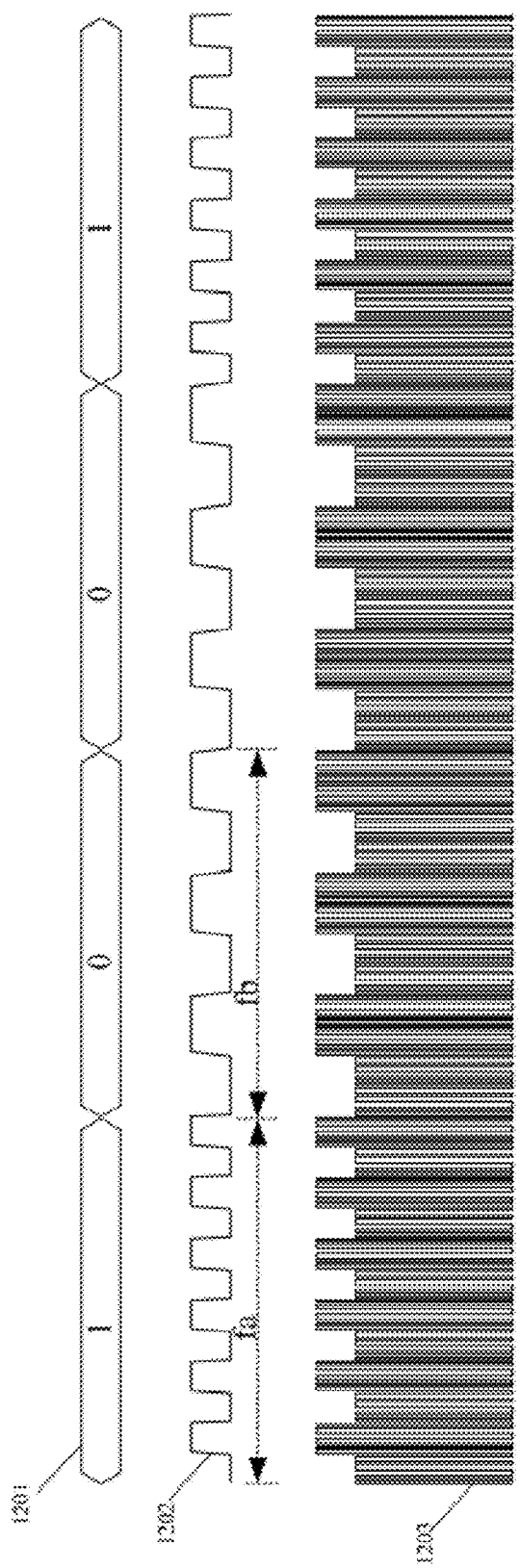
FIG. 14 is a schematic diagram of performing coding or frequency modulation on a control message frame by using a square-wave frequency signal according to an embodiment of the present invention.

When a square-wave frequency signal is used to perform coding or frequency modulation on the control frame, a description may be provided by using a schematic diagram shown in FIG. 14 as an example. It is assumed that square-wave signals whose frequencies are fa and fb are used to represent "1" and "0" respectively. After data "1001" in an original frame 1201 is coded by using square-wave signals (or square-wave frequency signals) whose frequencies are fa and fb, a coded signal that is spliced by "fa-fb-fb-fa" and that is shown by 1202 is obtained. Finally, the coded signal is used to perform re-modulation (1203) on a data signal or is directly sent to a peer end. It should be pointed out that only a re-modulated signal 1203 is provided herein. When a data signal does not exist or data transmission is not started, the signal coded in 1202 is directly sent to the peer end. In addition, when a sine wave is used to represent or code data in the control message frame, the manner is similar to that used for a square-wave signal, and details are not described herein again.

Further, a same frequency may be used, and signals of opposite phases are used to represent "1" and "0" in the control message respectively.

Further, the embodiments of the present invention further provide a central office end device. The OLT-side optical module provided in the foregoing embodiments is disposed on the central office end device.

Further, the embodiments of the present invention further provide a terminal device. The ONU-side optical module provided in the foregoing embodiments is disposed on the terminal device.

The foregoing descriptions are merely examples of specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method, comprising:
   a: selecting a downstream wavelength to be received;
   b: listening to a downstream message on the downstream to-be-received wavelength, performing c when a wavelength idle message from a peer optical module is received, and returning to a when no wavelength idle message is received within a specified or fixed time, wherein the wavelength idle message identifies that the downstream to-be-received wavelength is not occupied or not allocated, wherein M is a length of a random code representing data in a frame header field of a message frame of the wavelength idle message, N is a length of a random code representing data content in a data field of the message frame of the wavelength idle message, and wherein when M is the same as N, a plurality of bits of the message frame represent a frame header, and when M is different from N, one bit of the message frame represents the frame header;
   c: sending a wavelength application message on an upstream wavelength corresponding to the downstream to-be-received wavelength, going to d when a wavelength grant message is received in a downstream direction; otherwise, returning to a or b, wherein the wavelength application message identifies that an optical module requests the peer optical module to allocate the downstream to-be-received wavelength, and the wavelength grant message identifies that the peer optical module allocates the downstream to-be-received wavelength to the optical module; and
   d: setting, by the optical module, an optical port auto-negotiation success flag bit.

2. The method according to claim 1, further comprising: storing a correspondence between upstream wavelengths and downstream wavelengths in the optical module in a form of a table, wherein the correspondence is agreed upon in advance, or is dynamically configured by an optical network unit (ONU) device using an interface between the ONU device and the optical module at an ONU side, or is delivered to a processor of the optical module at the ONU side using a control message.

3. The method according to claim 2, wherein when the correspondence between upstream wavelengths and downstream wavelengths is agreed upon in advance or dynamically configured, the optical module sets an operating wavelength or a to-be-sent wavelength of a sending component of the optical module at any moment before the wavelength application message is sent.

4. The method according to claim 2, wherein when the correspondence between upstream wavelengths and downstream wavelengths is delivered using a control message, an operating wavelength or an upstream wavelength of a sending component of the optical module is set after the wavelength idle message from the peer optical module is received and before the wavelength application message is sent.

5. The method according to claim 1, wherein the message frame of the wavelength idle message further comprises an allowed laser spectral width field, a channel interval field, or a system type field.

6. A method, comprising:
   periodically sending, by a local optical module, a wavelength idle message to a peer optical module, and listening in an upstream direction, wherein the wavelength idle message identifies that a first wavelength is an idle wavelength, or the wavelength idle message identifies that the first wavelength is not occupied or not allocated, wherein M is a length of a random code representing data in a frame header field of a message frame of the wavelength idle message, N is a length of a random code representing data content in a data field of the message frame of the wavelength idle message, and wherein when M is the same as N, a Plurality of bits of the message frame represent a frame header, and when M is different than N one bit of the message frame represents the frame header;

suspending sending wavelength idle information when a message, sent by the peer optical module, for requesting allocation of the first wavelength is received;

sending a wavelength application success message to the peer optical module; and setting an internal state when a response message sent by the peer optical module is received, wherein the setting identifies completion of a wavelength negotiation.

7. The method according to claim 6, wherein the wavelength idle message and the wavelength application success message are coded by means of frequency-shift keying (FSK).

8. The method according to claim 6, wherein the wavelength idle message and the wavelength application success message are coded in a spectrum spreading manner, and the spectrum spreading manner identifies that spectrum spreading is performed on original signals 0 and 1 using a random code and then the signals are superposed with a data signal and transmitted.

9. An optical module, comprising:
a transmitter;
a processor; and
a receiver;
wherein the receiver is configured to select a downstream to-be-received wavelength;
wherein the processor is configured to listen to a downstream message on the selected downstream to-be-received wavelength, and send a wavelength application message on an upstream wavelength using the transmitter when a wavelength idle message from a peer optical module is received; wherein M is a length of a random code representing data in a frame header field of a message frame of the wavelength idle message, N is a length of a random code representing data content in a data field of the message frame of the wavelength idle message, and wherein when M is the same as N a plurality of bits of the message frame represent a frame header, and when M is different than N one bit of the message frame represents the frame header; and
wherein the processor is further configured to set an optical port negotiation success flag bit of the optical module when the receiver receives a wavelength grant message in a downstream direction.

10. The optical module according to claim 9, wherein the optical module further comprises a memory, and the memory is configured to store a correspondence between upstream wavelengths and downstream wavelengths.

11. The optical module according to claim 10, wherein when the correspondence between upstream wavelengths and downstream wavelengths is agreed upon in advance or dynamically configured, the optical module sets an operating wavelength or a to-be-sent wavelength of a sending component of the optical module at any moment before sending the wavelength application message.

12. The optical module according to claim 10, wherein when the correspondence between upstream wavelengths and downstream wavelengths is delivered using a control message, an operating wavelength or an upstream wavelength of the transmitter of the optical module is set after the wavelength idle message from the peer optical module is received and before the wavelength application message is sent.

13. The optical module according to claim 9, wherein the message frame of the wavelength application message further comprises a local to-be-sent wavelength field, and the local to-be-sent wavelength field denotes wavelength information using an absolute value, a relative value, or a channel number.

14. The optical module according to claim 9, wherein the message frame of the wavelength idle message further comprises an allowed laser spectral width field, a channel interval field, or a system type field.

15. An optical module, comprising:
a transmitter;
a receiver; and
a processor;
wherein the transmitter periodically sends a wavelength idle message to a peer optical module and the receiver listens in an upstream direction, and the wavelength idle message identifies that a first wavelength is an idle wavelength, or the wavelength idle message identifies that the first wavelength is not occupied or not allocated; wherein M is a length of a random code representing data in a frame header field of a message frame of the wavelength idle message, N is a length of a random code representing data content in a data field of the message frame of the wavelength idle message, wherein when M is the same as N, a plurality of bits of the message frame represent a frame header, and when M is different than M one bit represents the frame header;
wherein the receiver suspends sending wavelength idle information when receiving a message, sent by the peer optical module, for requesting allocation of the first wavelength;
wherein the transmitter is further configured to send a wavelength application success message to the peer optical module; and
wherein the processor is configured to set an internal state when the receiver receives a response message sent by the peer optical module, and the setting identifies completion of wavelength negotiation.

16. The optical module according to claim 15, wherein the transmitter is further configured to send a wavelength acknowledgment message to the peer optical module before the internal state is set.

17. The optical module according to claim 15, wherein, when the transmitter and the receiver of the optical module are components with a tunable wavelength or capable of tuning a wavelength, the optical module sets operating wavelengths of the transmitter and the receiver according to configuration information.

18. The optical module according to claim 17, wherein the wavelength idle message and the wavelength application success message are coded in a spectrum spreading manner, and the spectrum spreading manner identifies that spectrum spreading is performed on original signals 0 and 1 using a random code and then the signals are superposed with a data signal and transmitted.

* * * * *